Figure 5:
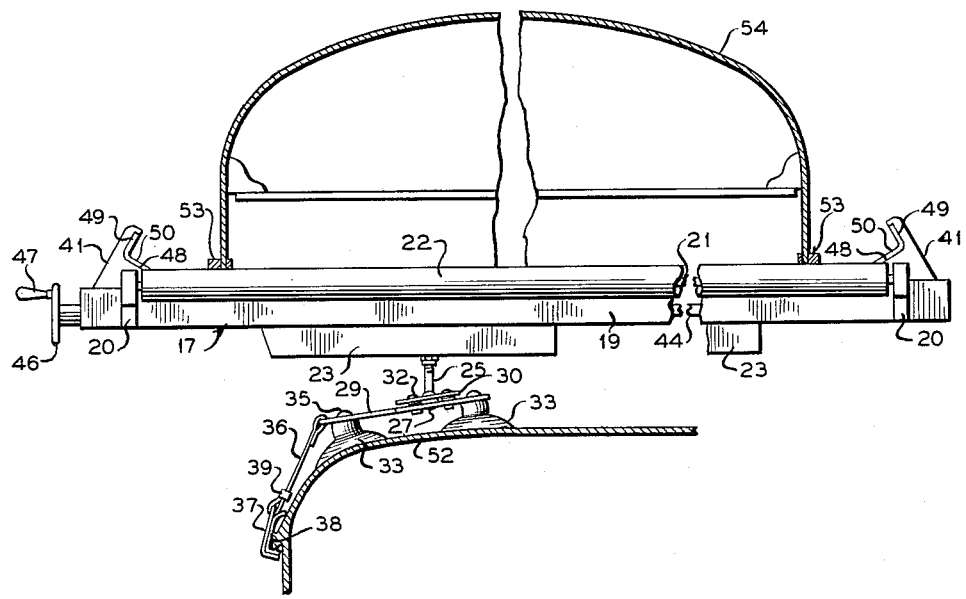

Jan. 6, 1953 E. W. NEWMAN 2,624,497
CAR TOP BOAT CARRIER
Filed Feb. 2, 1951 2 SHEETS—SHEET 1
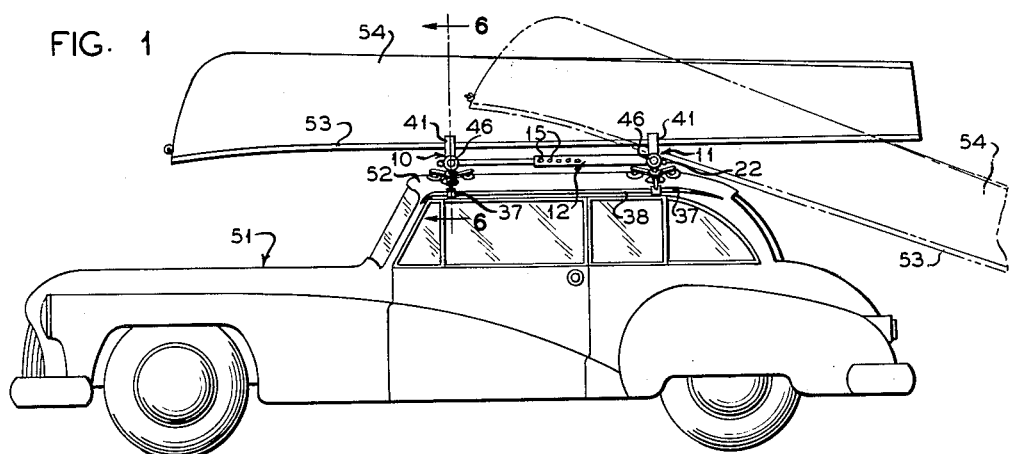
FIG. 1
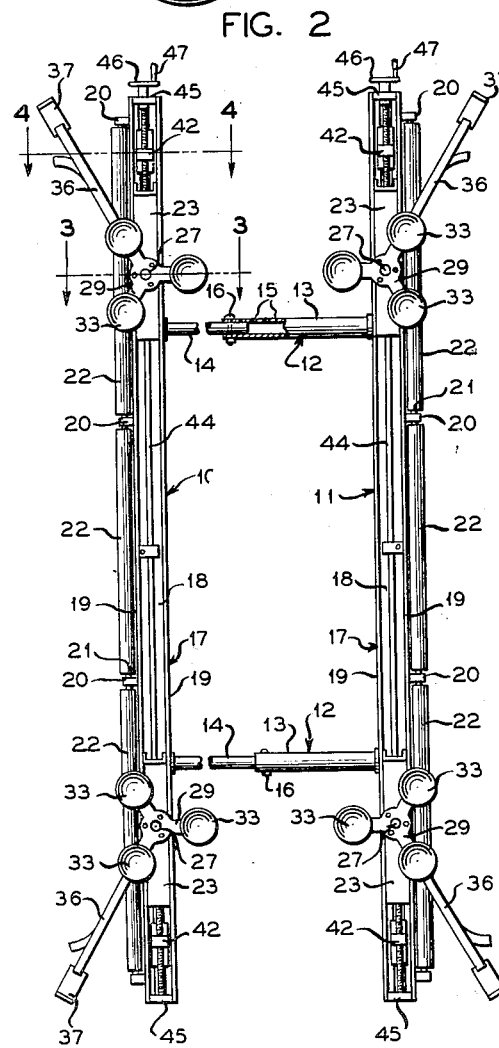
FIG. 2
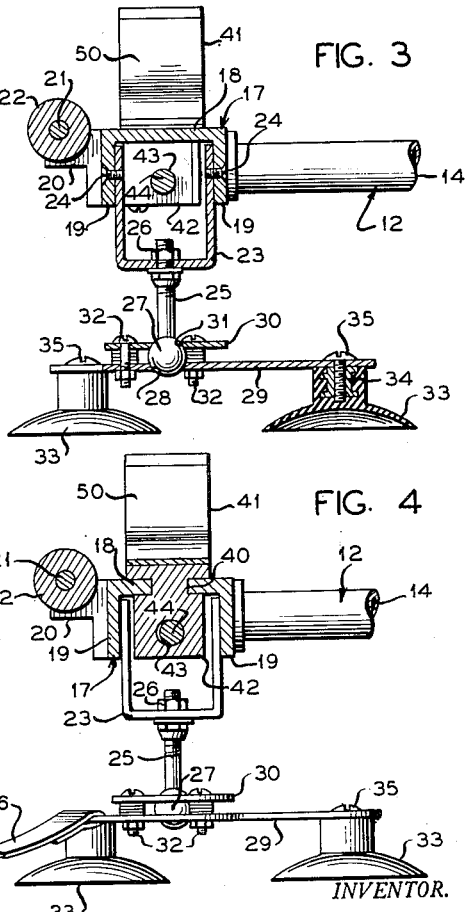
FIG. 3
FIG. 4
INVENTOR.
E. W. NEWMAN
BY
A. Yates Dowell
ATTORNEY Jan. 6, 1953 E. W. NEWMAN 2,624,497
CAR TOP BOAT CARRIER Filed Feb. 2, 1951 2 SHEETS—SHEET 2

INVENTOR.
E. W. NEWMAN
BY
H. Yates Dowell
ATTORNEY

Patented Jan. 6, 1953

2,624,497

UNITED STATES PATENT OFFICE 2,624,497

CAR TOP BOAT CARRIER

Edgar W. Newman, Evansville, Ind.

Application February 2, 1951, Serial No. 209,125

12 Claims. (Cl. 224—42.1)

1

This invention relates to transportation and more particularly to a carrier designed to be applied to the top of an automobile and to receive and to clamp in position thereon a boat of the type commonly used with an outboard motor in order to transport the same from place to place.

The development of the outboard motor to its present high degree of efficiency and dependability has resulted in a fantastic increase in the number of boat owners, the number increasing from a few thousand to many hundreds of thousands. Since many of these boat owners live a considerable distance from water it has been necessary to develop boat transportation means which is relatively light and simple to use and in view of the fact that often only one man is in the family, operation by this one man is highly desirable if not absolutely necessary. Boat carriers developed in the past have ranged from a relatively simple pair of wheels clamped to the boat and utilizing the hull thereof as a chassis to form a trailer, the bow of the boat being attached to the towing vehicle, to complicated trailer devices incorporating force multiplying means for facilitating launching, beaching and loading of the boat on the trailer. The latter devices, while very convenient and efficient, are relatively costly and, consequently, tend to restrict boating of this type to persons in the higher income brackets.

Several types of car top boat carriers have heretofore been developed, but the majority of these were merely adaptations of the well-known type of car top carrier heretofore used for transporting camping equipment or other merchandise on the top of the automobile. The type of boat carrier utilizing the hull as a part of the trailer chassis, while relatively economical and convenient, nevertheless, imposes strain on the boat hull for which the same has not been designed and frequently results in damage thereto, repair of which is relatively costly. A further disadvantage of boat trailers is the fact that unless they are well designed and well constructed, they may constitute a hazard on the highway which, of course, should be avoided.

It is therefore an object of the invention to provide a car top boat carrier upon which a boat may be conveniently loaded or unloaded by one man.

It is a further object of the invention to provide a car top boat carrier in which means is incorporated to adapt the same to any type of automobile with particular regard to the length of the roof portion and the configuration of the surface thereof.

2

It is a further object of the invention to provide a car top boat carrier in which antifriction means is incorporated to facilitate loading and unloading of the boat and in which means is also provided to firmly clamp the boat in position and out of engagement with such antifriction means during transportation of the boat.

It is a further object of the invention to provide a car top boat carrier of relatively economical construction which may be fabricated from readily available material and structural shapes and in which the use of skilled labor in the fabrication thereof is substantially avoided resulting in a device which may be sold in a highly competitive market.

Figure 6:
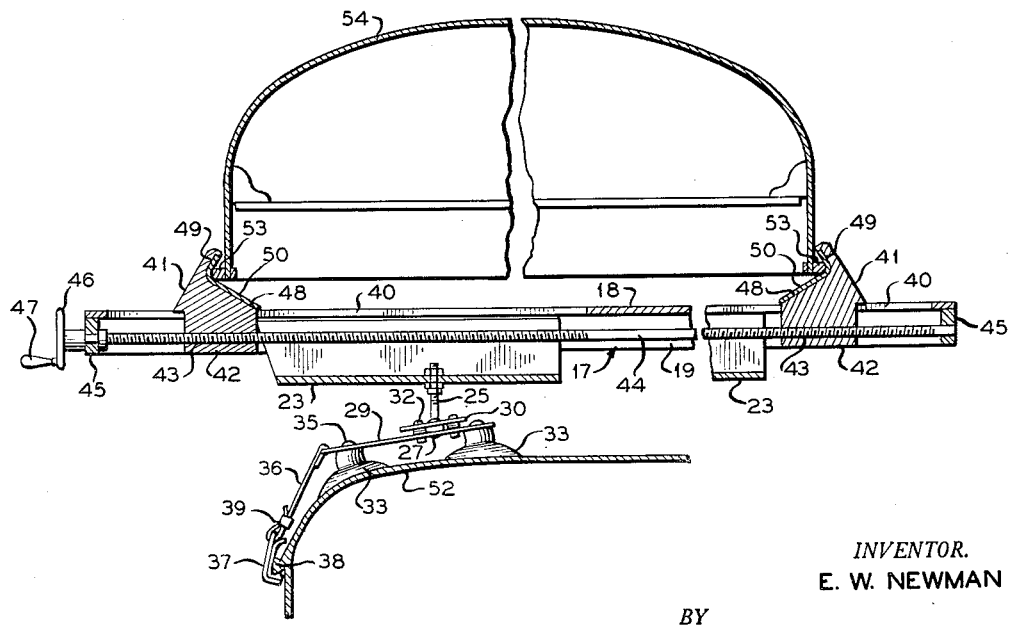

Further objects and advantages of the invention will be apparent from the following description taken in conjunction with the accompanying drawings, wherein:

Fig. 1 is a side elevational view of the car top boat carrier of this invention applied to an automobile and showing a boat in full lines positioned thereon for transportation and showing a boat in phantom in the position it occupies during loading and unloading thereof;

Fig. 2, a bottom plan view of the car top boat carrier of this invention showing particularly the arrangement of the engaging means for supporting the same on the top of the automobile as well as the details of the clamping means for securing the boat in position thereon;

Fig. 3, a fragmentary sectional view on the line 3—3 of Fig. 2 and showing the details of the means for permitting firm engagement of the boat carrier with the automobile top, regardless of the configuration of the same;

Fig. 4, a fragmentary sectional view on the line 4—4 of Fig. 2 and showing the details of the clamping means for securing the boat in position, together with the actuating screw therefor;

Fig. 5, a fragmentary elevational view with parts and section for greater clarity and showing a boat in position on the carrier prior to clamping the same for transportation; and Fig. 6, a fragmentary sectional view on the line 6—6 of Fig. 1 and showing the details of the clamping means and a boat clamped in position thereby for transportation.

With continued reference to the drawings, the car top boat carrier of this invention may be provided with a generally rectangular frame consisting of front and rear supporting bars 10 and 11 and longitudinally extending adjustable tie rods 12 connecting the front and rear bars 10 and 11. The tie rods 12 may consist of a tubular portion 13 telescopically receiving a smaller rod 14, there being a plurality of apertures 15 in the portion 13 for receiving fastening means 16 to adjustably couple the parts 13 and 14 of the tie rod 12 together. In this way the carrier may be adjusted for various lengths of automobile tops.

The front and rear supporting bars 10 and 11 are identical in construction and a description of one will suffice for both. The supporting bars 10 and 11 are formed of inverted channel members 17 having a web portion 18 and legs 19. The tie rods 12 are connected to one leg 19 of the channels 17 and outwardly extending ears 20 are secured to the other legs. Ears 20 serve to support a shaft 21 on which is rotatably mounted a plurality of rollers 22. The purpose and operation of the rollers will be later described.

The bars 10 and 11 are supported on the top of an automobile by brackets 23 which are secured to the legs 19 of the channel 17 by screw-threaded fastening means or the like 24, the brackets 23 serving to receive and support a stud 25 secured thereto by a screw-threaded fastening means or the like 26, the lower end of the stud 25 terminating in a ball 27. Ball 27 is received in a spherical recess 28 in a supporting plate 29, the ball 27 and stud 25 being clamped in position by a clamping plate 30 having a spherical recess 31, the walls of which engage the ball 27, clamping plate 30 being tightly urged against the ball 27 to firmly fix the same and stud 25 in adjusted position by screw-threaded fastening means or the like 32 extending through the clamping plate 30 and supporting plate 29.

The supporting plate 29 is provided with a plurality of suction cups 33 of rubber or other suitable material, these cups being provided with a metallic insert 34 for receiving suitable fastening means 35 by means of which the cups 33 are secured to the supporting plate 29. The supporting plate 29 and cups 33 are adjusted to conform to the curvature of the automobile top to which the boat carrier is to be fitted by simply loosening the fastening means 32 to permit movement of the plate 29 with relation to the ball 27 and stud 25 by reason of the ball and socket joint, after which the fastening means 32 is tightened to securely clamp the supporting plate 29 and suction cups 33 in adjusted position.

Two of these supporting assemblies are provided for each bar 10 and 11 and serve as a four-point support on the car top. The carrier is further secured in position on the car top by straps or other suitable flexible means 36 secured to the supporting plate 29, the opposite end of the strap 36 terminating in a hook 37 which may engage beneath the rain gutter 38 of the automobile, there being provided a buckle 39 to permit adjustment of the strap 36 in order to accommodate the same for different dimensions in different types of automobiles. The carrier is shown secured in position on an automobile top in Figs. 1, 5 and 6.

Each supporting bar 10 and 11 is provided adjacent the end thereof with a slot 40 formed in the web 18, these slots serving to receive and slidably support opposed boat-clamping jaws 41. Jaws 41 are provided with downwardly extending portions 42, each of which has a threaded aperture 43 therethrough, the threads in one jaw 41 being right hand and the threads in the opposite jaw being left hand. A clamping rod 44 extends longitudinally of each supporting bar 10 and 11 within the channel thereof, rod 44 being journaled for rotation in end plates 45 and being provided with right and left hand threads to engage and mate with the threads in apertures 43 in the jaws 41. Clamping rod 44 is provided at one end thereof with an actuating handwheel 46 having a crank 47 thereon to facilitate convenient operation of the rod 44 and movement of the clamping jaws 41 toward or from each other.

Clamping jaws 41 are provided with an outwardly and upwardly extending inclined lower surface 48 which, in conjunction with an inwardly and upwardly extending upper surface 49, provides a generally V-shaped clamping jaw face. The surfaces 48 and 49 may be covered with suitable material 50, such as oiled leather or the like, the purpose and function of which will be presently described.

The carrier is applied to the top of an automobile 51, as shown in Fig. 1, by adjusting the supporting plates 29 and suction cups 33 to conform to the curvature of the top 52 of the automobile, the plates 29 and cups 33 being clamped in position by the fastening means 32 whereupon the hooks 37 are engaged beneath the rain gutters 38 and the straps 36 tighten by means of the buckles 39 to securely bind the carrier in position on the car top. Obviously, the tie rods 12 would be adjusted to accommodate the carrier to the length of the car top being utilized.

As shown in Fig. 5, the hand-wheels 46 are actuated to rotate the clamping rods 44 and move the clamping jaws 41 apart a sufficient distance to permit the gunwales 53 of a boat 54 to pass between the jaws 41 without contacting the same. As shown in dotted lines in Fig. 1, the bow of the boat 54 is first positioned on the rollers 22 of the rear supporting bar 11, the stern of the boat being supported during this operation by the person loading the same on the automobile. The boat is moved forwardly on the rollers 22 until such time as it is substantially centered longitudinally of the automobile, the stern being raised simultaneously until the entire boat rests on the rollers 22 on both the front and rear supporting bars 10 and 11. At this time the hand-wheels 46 on clamping bars 44 are actuated to move the clamping jaws 41 toward each other until the oiled leather, or other suitable means 50 on the upwardly inclined faces 48 of the clamping jaws 41, engages the gunwales 53 of the boat 54 and, due to the inclined plane effect, raises the boat upwardly away from the rollers 22. Movement of the jaws 41 toward each other is continued until the jaws firmly engage and clamp the gunwales 53 of the boat 54 therebetween. This operation securely locks the boat 54 in position and prevents any relative movement of the same during transportation. When it is desired to remove the boat for use, it is only necessary to operate the hand-wheels 46 to move the clamping jaws away from each other which will lower the boat onto the rollers 22, after which the same may be moved rearwardly and lowered to the ground. Obviously, if desired, some means may be provided for locking the hand-wheels 46 and clamping rods 44 against rotation in order to prevent unauthorized removal of the boat from the carrier and also to preclude any possibility of the jaws 41 becoming disengaged from the boat due to vibration or other causes during transportation.

It will be seen that by the above invention there has been provided a relatively simple and inexpensive car top boat carrier which provides means for facilitating loading and unloading of the boat by one person and which also provides means for firmly clamping and locking the boat in position on the car top for transportation. Relatively simple means has also been provided to facilitate adjustment of the carrier to fit car tops of various lengths and configuration and during periods of non-use the carrier may be collapsed into relatively small size to facilitate storage of the same. Further, the carrier readily adapts itself to all sizes and types of boats which may be practically transported on the top of an automobile.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A car top boat carrier comprising transversely extending front and rear supporting bars connected by adjustable longitudinally extending tie rods, said supporting bars comprising inverted channels, spaced car top engaging and supporting means for each supporting bar, each supporting means comprising a stud secured to said bar, a supporting plate, a ball and socket joint connecting said plate and said stud, a plurality of suction cups fixed to said plate and adjustable flexible means connected to said plate and including means to engage a part of the car, whereby the relative position of said suction cups may be adjusted to conform to the configuration of the car top and said supporting bars firmly secured thereto by said cups and said flexible means, longitudinally disposed rollers mounted on said bars and projecting above the upper surface thereof, said rollers extending substantially the entire length of said bars, opposed clamping jaws slidably mounted on said bars, each jaw comprising a clamping portion projecting above said bar and including an outwardly and upwardly inclined lower surface merging into an inwardly and upwardly extending upper surface to provide a substantially V-shaped face, the lower end of said lower surface being below the top surface of said rollers and the upper end of said lower surface being above the top surface of said rollers, a resilient lining on said jaw face and an actuating portion disposed in the channel of said bar and having a threaded aperture, the threads in one jaw being right hand and in the opposed jaw left hand, a clamping rod disposed in the channel of said bar and having right and left hand threads engaging the threads in said jaws whereby the bow of a boat may be placed on the rear roller and the stern of the boat moved upwardly and forwardly to dispose said boat in proper position on both front and rear rollers and upon rotation of said clamping rods to move said jaws toward each other said lower surfaces will engage the gunwales of said boat to lift the same from said rollers, continued movement of said jaws serving to firmly clamp said boat in carrying position.

2. A car top boat carrier comprising transversely extending front and rear supporting bars connected by longitudinally extending tie rods, said supporting bars comprising inverted channels, spaced car top engaging and supporting means for each supporting bar, each supporting means comprising a stud secured to said bar, a supporting plate, a ball and socket joint connecting said plate and said stud, a plurality of suction cups fixed to said plate and adjustable flexible means connected to said plate and including means to engage a part of the car whereby the relative position of said suction cups may be adjusted to conform to the configuration of the car top and said supporting bars firmly secured thereto by said cups and said flexible means, longitudinally disposed rollers mounted on said bars and projecting above the upper surface thereof, said rollers extending substantially the entire length of said bars, opposed clamping jaws slidably mounted on said bars, each jaw comprising a clamping portion projecting above said bar and including an outwardly and upwardly inclined lower surface merging into an inwardly and upwardly extending upper surface to provide a substantially V-shaped jaw face, the lower end of said lower surface being below the top surface of said rollers and the upper end of said lower surface being above the top surface of said rollers, a resilient lining on said jaw face and an actuating portion disposed in the channel of said bar and having a threaded aperture, the threads in one jaw being right hand and in the opposed jaw left hand, a clamping rod disposed in the channel of said bar and having right and left hand threads engaging the threads in said jaws whereby the bow of a boat may be placed on the rear roller and the stern of the boat moved upwardly and forwardly to dispose said boat in proper position on both front and rear rollers and upon rotation of said clamping rods to move said jaws toward each other said lower surfaces will engage the gunwales of said boat to lift the same from said rollers, continued movement of said jaws serving to firmly clamp said boat in carrying position.

3. A car top boat carrier comprising transversely extending front and rear supporting bars connected by longitudinally extending tie rods, said supporting bars comprising inverted channels, spaced car top engaging and supporting means for each supporting bar, each supporting means comprising a stud secured to said bar, a supporting plate, a ball and socket joint connecting said plate and said stud, a plurality of suction cups fixed to said plate and adjustable flexible means connected to said plate and including means to engage a part of the car whereby the relative position of said suction cups may be adjusted to conform to the configuration of the car top and said supporting bars firmly secured thereto by said cups and said flexible means, longitudinally disposed rollers mounted on said bars and projecting above the upper surface thereof, opposed clamping jaws slidably mounted on said bars, each jaw comprising a clamping portion projecting above said bar and including an outwardly and upwardly inclined lower surface merging into an inwardly and upwardly extending upper surface to provide a substantially V-shaped jaw face, the lower end of said lower surface being below the top surface of said rollers and the upper end of said lower surface being above the top surface of said rollers, a resilient lining on said jaw face and an actuating portion disposed in the channel of said bar and having a threaded aperture, the threads in one jaw being right hand and in the opposed jaw left hand, a clamping rod disposed in the channel of said bar and having right and left hand threads engaging the threads in said jaws whereby the bow of a boat may be placed on the rear roller and the stern of the boat moved upwardly and forwardly to dispose said boat in proper position on both front and rear rollers and upon rotation of said clamping rods to move said jaws toward each other said lower surfaces will engage the gunwales of said boat to lift the same from said rollers, continued movement of said jaws serving to firmly clamp said boat in carrying position.

4. A car top boat carrier comprising transversely extending front and rear supporting bars connected by longitudinally extending tie rods, said supporting bars comprising inverted channels, spaced car top engaging and supporting means for each supporting bar, each supporting means comprising a stud secured to said bar, a supporting plate, a ball and socket joint connecting said plate and said stud, a plurality of suction cups fixed to said plate and adjustable flexible means connected to said plate and including means to engage a part of the car whereby the relative position of said suction cups may be adjusted to conform to the configuration of the car top and said supporting bars firmly secured thereto by said cups and said flexible means, longitudinally disposed rollers mounted on said bars and projecting above the upper surface thereof, opposed clamping jaws slidably mounted on said bars, each jaw comprising a clamping portion projecting above said bar and including an outwardly and upwardly inclined lower surface merging into an inwardly and upwardly extending upper surface to provide a substantially V-shaped jaw face, the lower end of said lower surface being below the top surface of said rollers and the upper end of said lower surface being above the top surface of said rollers, and an actuating portion disposed in the channel below said bar and having a threaded aperture, the threads in one jaw being right hand and in the opposed jaw left hand, a clamping rod disposed in the channel of said bar and having right and left hand threads engaging the threads in said jaws whereby the bow of a boat may be placed on the rear roller and the stern of the boat moved upwardly and forwardly to dispose said boat in proper position on both front and rear rollers and upon rotation of said clamping rods to move said jaws toward each other said lower surfaces will engage the gunwales of said boat to lift the same from said rollers, continued movement of said jaws serving to firmly clamp said boat in carrying position.

5. A car top boat carrier comprising transversely extending front and rear supporting bars connected by longitudinally extending tie rods, said supporting bars comprising inverted channels, spaced car top engaging and supporting means for each supporting bar, each supporting means comprising a stud secured to said bar, a supporting plate, a ball and socket joint connecting said plate and said stud, a plurality of suction cups fixed to said plate and adjustable flexible means connected to said plate and including means to engage a part of the car whereby the relative position of said suction cups may be adjusted to conform to the configuration of the car top and said supporting bars firmly secured thereto by said cups and said flexible means, longitudinally disposed rollers mounted on said bars and projecting above the upper surface thereof, opposed clamping jaws slidably mounted on said bars, each jaw comprising a clamping portion projecting above said bar and including an outwardly and upwardly inclined lower surface, the lower end of said lower surface being below the top surface of said rollers and the upper end of said lower surface being above the top surface of said rollers, and an actuating portion disposed in the channel of said bar having a threaded aperture, the threads in one jaw being right hand and in the opposed jaw left hand, a clamping rod disposed in the channel of said bar and having right and left hand threads engaging the threads in said jaws whereby the bow of a boat may be placed on the rear roller and the stern of the boat moved upwardly and forwardly to dispose said boat in proper position on both front and rear rollers and upon rotation of said clamping rods to move said jaws toward each other said lower surfaces will engage the gunwales of said boat to lift the same from said rollers, continued movement of said jaws serving to firmly clamp said boat in carrying position.

6. A car top boat carrier comprising transversely extending front and rear supporting bars, said supporting bars comprising an inverted channel, spaced car top engaging and supporting means for each supporting bar, each supporting means comprising a stud secured to said bar, a supporting plate, a ball and socket joint connecting said plate and said stud, a plurality of suction cups fixed to said plate and adjustable flexible means connected to said plate and including means to engage a part of the car whereby the relative position of said suction cups may be adjusted to conform to the configuration of the car top and said supporting bars firmly secured thereto by said cups and said flexible means, longitudinally disposed rollers mounted on said bars and projecting above the upper surface thereof, opposed clamping jaws slidably mounted on said bars, each jaw comprising a clamping portion projecting above said bar and including an outwardly and upwardly inclined lower surface, the lower end of said lower surface being below the top surface of said rollers and the upper end of said lower surface being above the top surface of said rollers, and an actuating portion disposed in the channel of said bar and having a threaded aperture, the threads in one jaw being right hand and in the opposed jaw left hand, a clamping rod disposed in the channel of said bar and having right and left hand threads engaging the threads in said jaws whereby the bow of a boat may be placed on the rear roller and the stern of the boat moved upwardly and forwardly to dispose said boat in proper position on both front and rear rollers and upon rotation of said clamping rods to move said jaws toward each other said lower surfaces will engage the gunwales of said boat to lift the same from said rollers, continued movement of said jaws serving to firmly clamp said boat in carrying position.

7. A car top boat carrier comprising transversely extending front and rear supporting bars, spaced car top engaging and supporting means for each supporting bar, each supporting means comprising a stud secured to said bar, a supporting plate, a ball and socket joint connecting said plate and said stud, a plurality of suction cups fixed to said plate and adjustable flexible means connected to said plate and including means to engage a part of the car whereby the relative position of said suction cups may be adjusted to conform to the configuration of the car top and said supporting bars firmly secured thereto by said cups and said flexible means, longitudinally disposed rollers mounted on said bars and projecting above the upper surface thereof, opposed clamping jaws slidably mounted on said bars, each jaw comprising a clamping portion position projecting above said bar and including an outwardly and upwardly inclined lower surface the lower end of said lower surface being below the top surface of said rollers and the upper end of said lower surface being above the top surface of said rollers, and an actuating portion disposed below said bar and having a threaded aperture, the threads in one jaw being right hand and in the opposed jaw left hand, a clamping rod disposed below said bar and having right and left hand threads engaging the threads in said jaws whereby the bow of a boat may be placed on the rear roller and the stern of the boat moved upwardly and forwardly to dispose said boat in proper position on both front and rear rollers and upon rotation of said clamping rods to move said jaws toward each other said lower surfaces will engage the gunwales of said boat to lift the same from said rollers, continued movement of said jaws serving to firmly clamp said boat in carrying position.

8. A car top boat carrier comprising transversely extending front and rear supporting bars, spaced car top engaging and supporting means for each supporting bar, each supporting means comprising a stud secured to said bar, a supporting plate, a ball and socket joint connecting said plate and said stud, a plurality of suction cups fixed to said plate and adjustable flexible means connected to said plate and including means to engage a part of the car whereby the relative position of said suction cups may be adjusted to conform to the configuration of the car top and said supporting bars firmly secured thereto by said cups and said flexible means, opposed clamping jaws slidably mounted on said bars, each jaw comprising a clamping portion projecting above said bar and including an outwardly and upwardly inclined lower surface, the lower end of said lower surface being substantially in the plane of the upper surface of said bars and an actuating portion disposed below said bar and having a threaded aperture, the threads in one jaw being right hand and in the opposed jaw left hand, a clamping rod disposed below said bar and having right and left hand threads engaging the threads in said jaws whereby the bow of a boat may be placed on the rear bar and the stern of the boat moved upwardly and forwardly to dispose said boat in proper position on both front and rear bars and upon rotation of said clamping rods to move said jaws toward each other said lower surfaces will engage the gunwales of said boat to lift the same from said bars, continued movement of said jaws serving to firmly clamp said boat in carrying position.

9. A car top boat carrier comprising transversely extending front and rear supporting bars, spaced car top engaging and supporting means for each supporting bar, each supporting means comprising a stud secured to said bar, a supporting plate being secured to said stud, a plurality of suction cups fixed to said plate and adjustable flexible means connected to said plate and including means to engage a part of the car whereby said supporting bars are firmly secured to said top by said cups and said flexible means, opposed clamping jaws slidably mounted on said bars, each jaw comprising a clamping portion projecting above said bar and including an outwardly and upwardly inclined lower surface, the lower end of said lower surface being substantially in the plane of the upper surface of said bars, and an actuating portion disposed below said bar and having a threaded aperture, the threads in one jaw being right hand and in the opposed jaw left hand, a clamping rod disposed below said bar and having right and left hand threads engaging the threads in said jaws whereby the bow of the boat may be placed on the rear bar and the stern of the boat moved upwardly and forwardly to dispose said boat in proper position on both front and rear bars and upon rotation of said clamping rods to move said jaws toward each other said lower surfaces will engage the gunwales of said boat to lift the same from said bars, continued movement of said jaws serving to firmly clamp said boat in carrying position.

10. A car top boat carrier comprising transversely extending front and rear supporting bars, spaced car top engaging and supporting means for each supporting bar comprising a plurality of suction cups and adjustable flexible means including means to engage a part of the car whereby said supporting bars are firmly secured to said top by said cups and said flexible means, opposed clamping jaws slidably mounted on said bars, each jaw comprising a clamping portion projecting above said bar and including an outwardly and upwardly inclined lower surface, the lower end of said lower surface being substantially in the plane of the upper surface of said bars and an actuating portion disposed below said bar and having a threaded aperture, the threads in one jaw being right hand and in the opposed jaw left hand, a clamping rod disposed below said bar and having right and left hand threads engaging the threads in said jaws whereby the bow of the boat may be placed on the rear bar and the stern of the boat moved upwardly and forwardly to dispose said boat in proper position on both front and rear bars and upon rotation of said clamping rods to move said jaws toward each other said lower surfaces will engage the gunwales of said boat to lift the same from said bars, continued movement of said jaws serving to firmly clamp said boat in carrying position.

11. A car top boat carrier comprising transversely extending front and rear supporting bars, spaced car top engaging and supporting means for each supporting bar, opposed clamping jaws slidably mounted on said bars, each jaw comprising a clamping portion projecting above said bar and including an outwardly and upwardly inclined lower surface, the lower end of said lower surface being substantially in the plane of the upper surface of said bars and an actuating portion disposed below said bar and having a threaded aperture, the threads in one jaw being right hand and in the opposed jaw left hand, a clamping rod disposed below said bar and having right and left hand threads engaging the threads in said jaws whereby the bow of the boat may be placed on the rear bar and the stern of the boat moved upwardly and forwardly to dispose said boat in proper position on both front and rear bars and upon rotation of said clamping rods to move said jaws toward each other said lower surfaces will engage the gunwales of said boat to lift the same from said bars, continued movement of said jaws serving to firmly clamp said boat in carrying position.

12. A car top boat carrier comprising transversely extending front and rear supporting bars, spaced car top engaging and supporting means for each supporting bar, opposed clamping jaws slidably mounted on said bars, each jaw comprising a clamping portion projecting above said bar and including an upwardly inclined lower surface, the lower end of said lower surface being substantially in the plane of the upper surface of said bars and means to move said jaws toward and away from each other whereby the bow of the boat may be placed on the rear bar and the stern of the boat moved upwardly and forwardly to dispose said boat in proper position on both front and rear bars and upon movement of said jaws toward said boat said lower surfaces will engage the gunwales to lift said boat from said bars, continued movement of said jaws serving to firmly clamp said boat in carrying position.

EDGAR W. NEWMAN.

REFERENCES CITED

The following references are of record in the file of this patent:

UNITED STATES PATENTS

| Number | Name | Date |
|---|---|---|
| 1,826,470 | Hutchinson | Oct. 6, 1931 |
| 2,446,092 | Lait | July 27, 1948 |
| 2,469,945 | Brei | May 10, 1949 |
| 2,480,353 | Bjork | Aug. 30, 1949 |
| 2,539,997 | Graves | Jan. 30, 1951 |
| 2,561,199 | Harder | July 17, 1951 |

FOREIGN PATENTS

| Number | Country | Date |
|---|---|---|
| 502,494 | Great Britain | Mar. 20, 1939 |